United States Patent [19]
Cayton

[11] 4,168,597
[45] Sep. 25, 1979

[54] LETTUCE PROCESSING APPARATUS
[75] Inventor: David W. Cayton, Cupertino, Calif.
[73] Assignee: Bud Antle, Inc., Salinas, Calif.
[21] Appl. No.: 881,616
[22] Filed: Feb. 27, 1978

Related U.S. Application Data
[62] Division of Ser. No. 658,273, Feb. 17, 1976, abandoned.

[51] Int. Cl.$^2$ .......................... B65B 55/00; B65B 63/08
[52] U.S. Cl. ....................................... 53/127; 15/3.14; 53/391
[58] Field of Search .................... 53/127, 391; 15/3.1, 15/3.11, 3.12, 3.13, 3.14, 3.15, 3.16

[56] References Cited
U.S. PATENT DOCUMENTS

| | | | |
|---|---|---|---|
| 3,128,485 | 4/1964 | Bradshaw et al. | 15/3.14 |
| 3,724,168 | 4/1973 | Cassady et al. | 53/391 X |

*Primary Examiner*—Travis S. McGehee
*Attorney, Agent, or Firm*—Thomas H. Olson

[57] ABSTRACT

A method and apparatus for harvesting and processing head lettuce wherein the lettuce is shredded immediately upon harvesting and before deterioration occurs. The shredded lettuce is retained in an insulated or refrigerated enclosure and then promptly transported to a mobile processing trailer where it is further cleaned and chilled and finally packaged for shipment. The practice of the method and apparatus permits the lettuce to be on its way to the consumer on the same day that it is harvested from the field.

A method and apparatus for simultaneously chilling, washing and adding preservatives to the chilled lettuce in a continuous fashion. A mobile enclosure embodying the apparatus and adapted to perform the method wherein the lettuce is maintained at a reduced temperature throughout all stages of processing.

7 Claims, 10 Drawing Figures

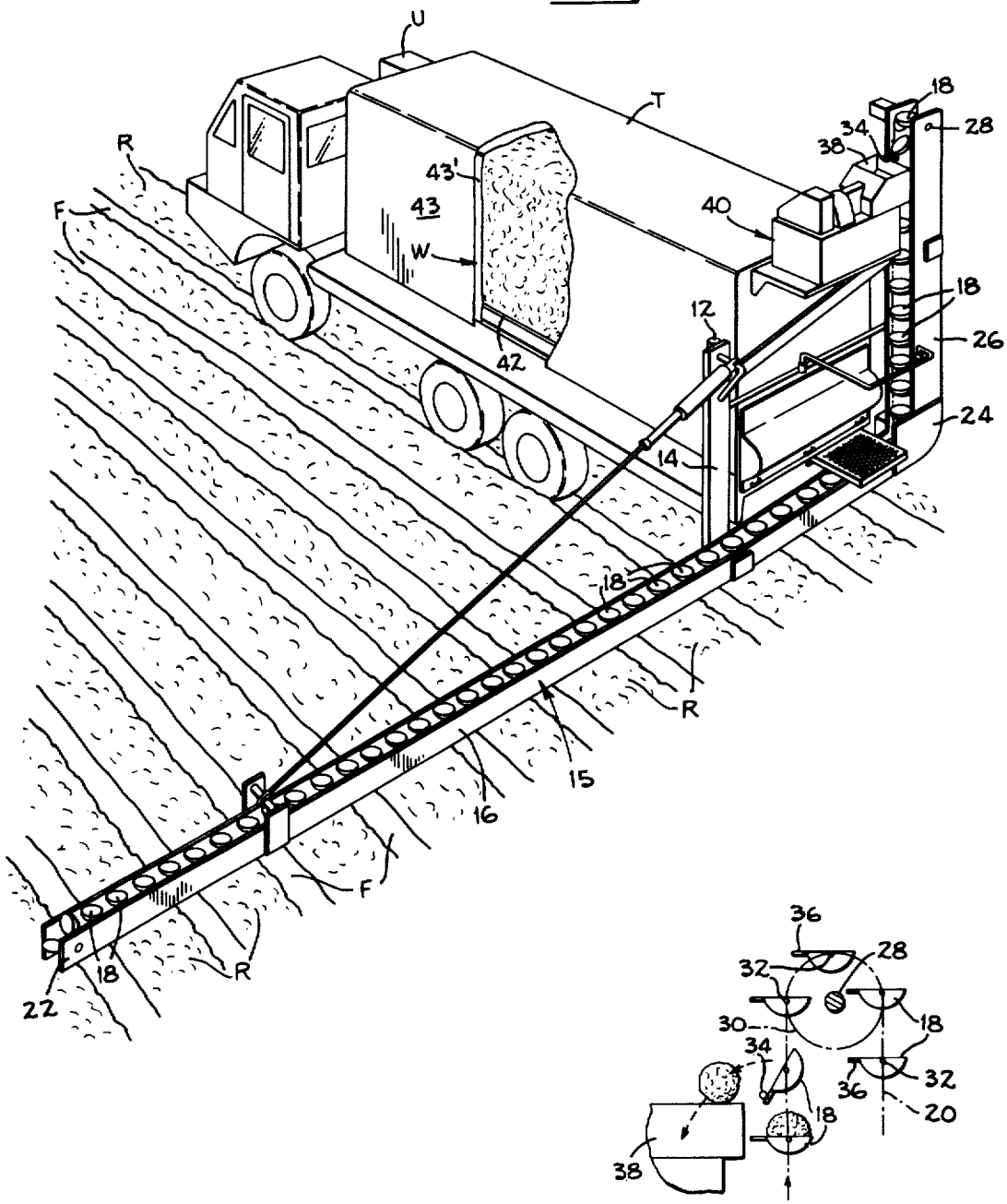
Fig_1
Fig_2

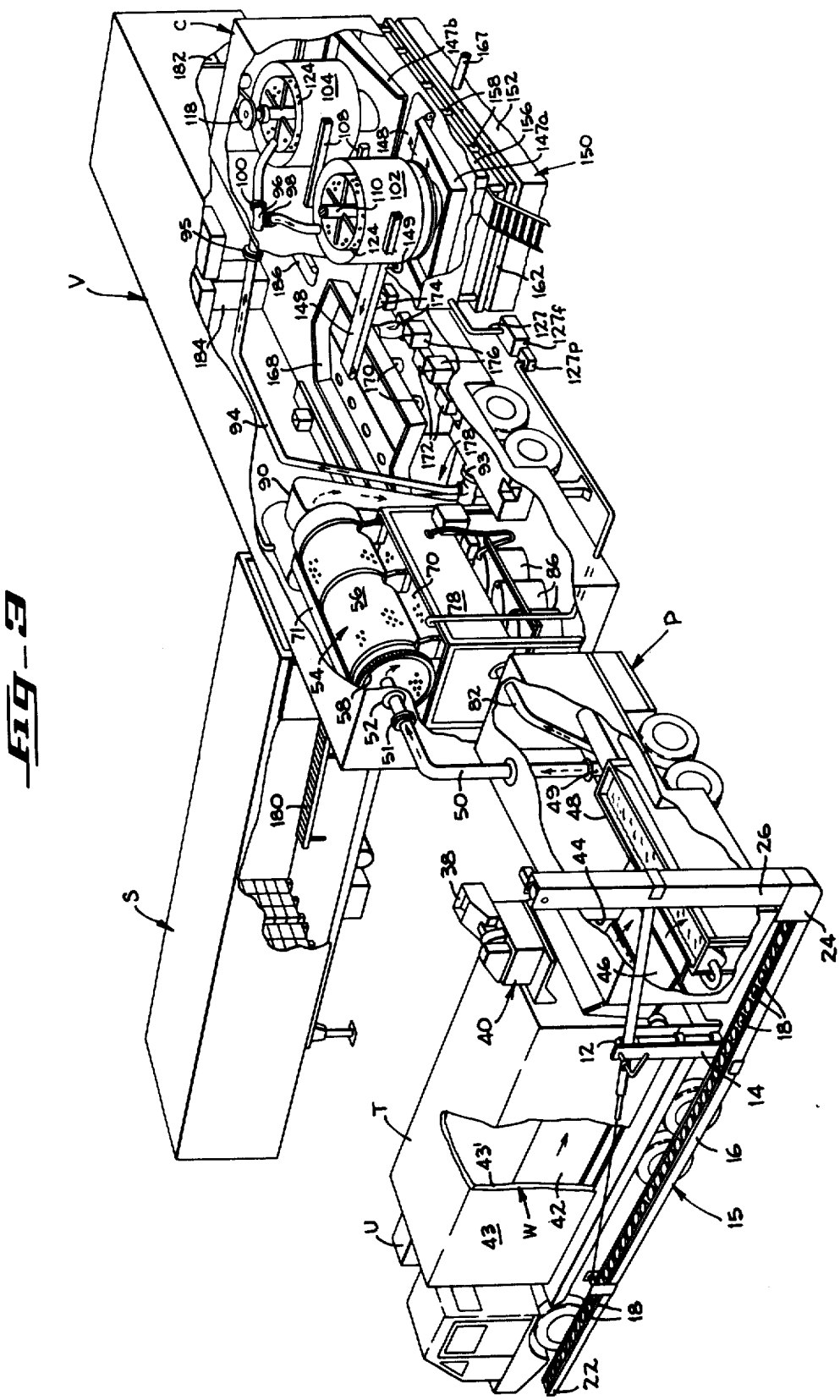

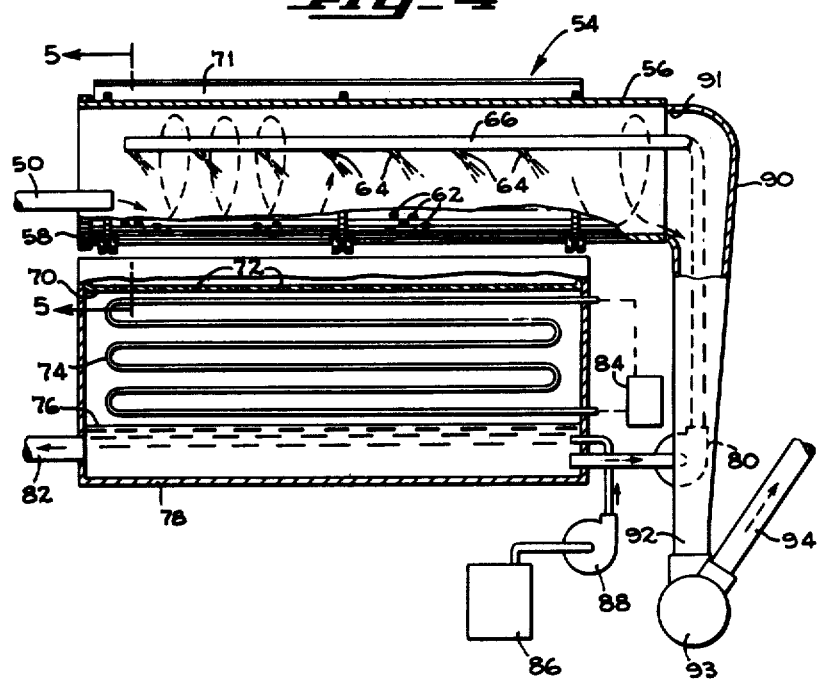
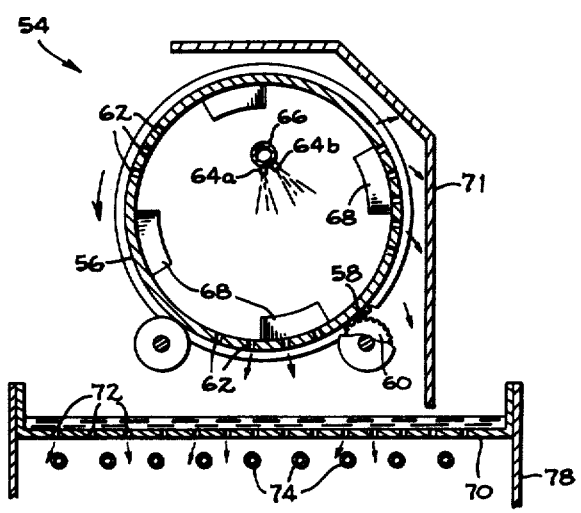

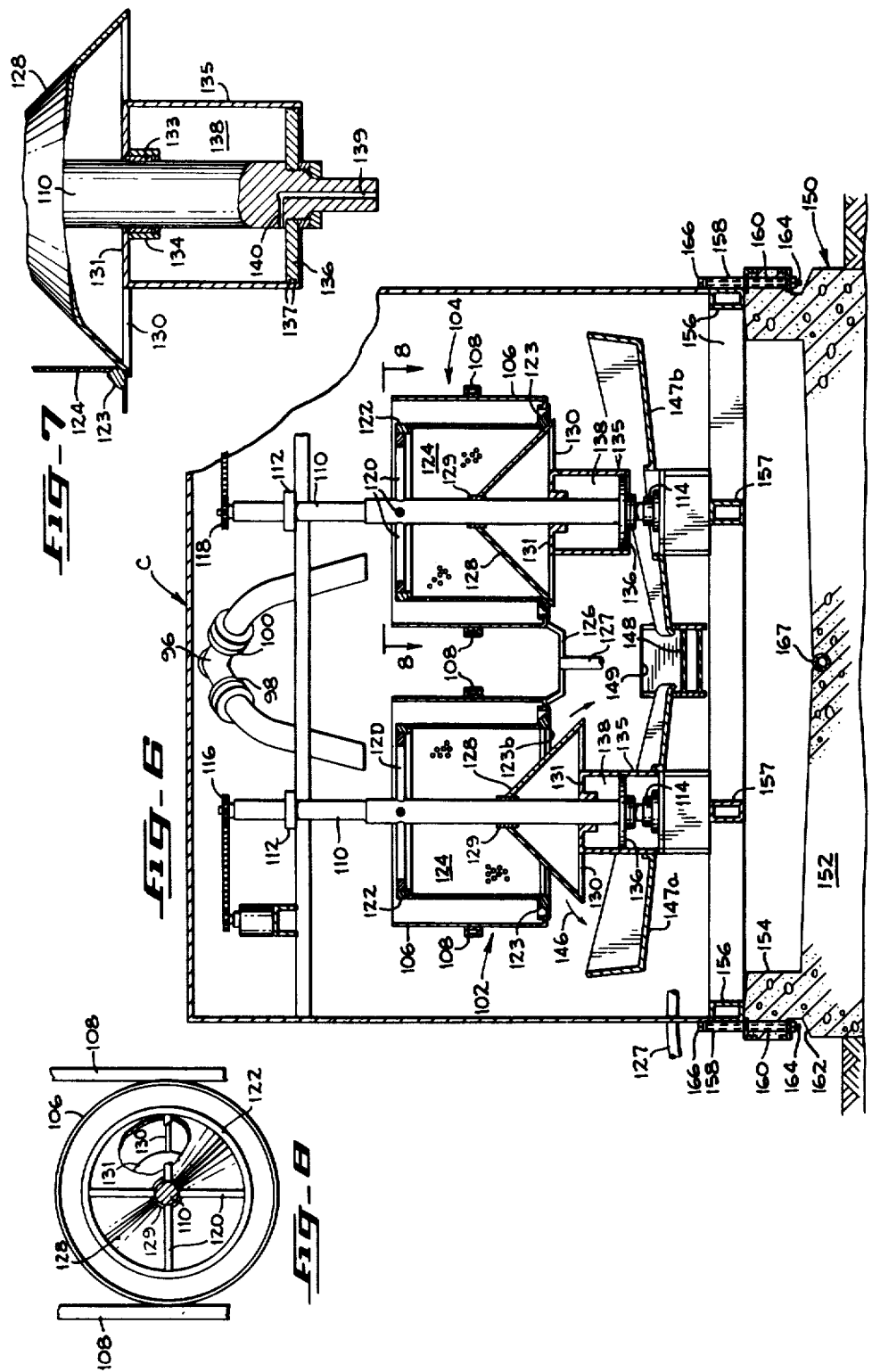

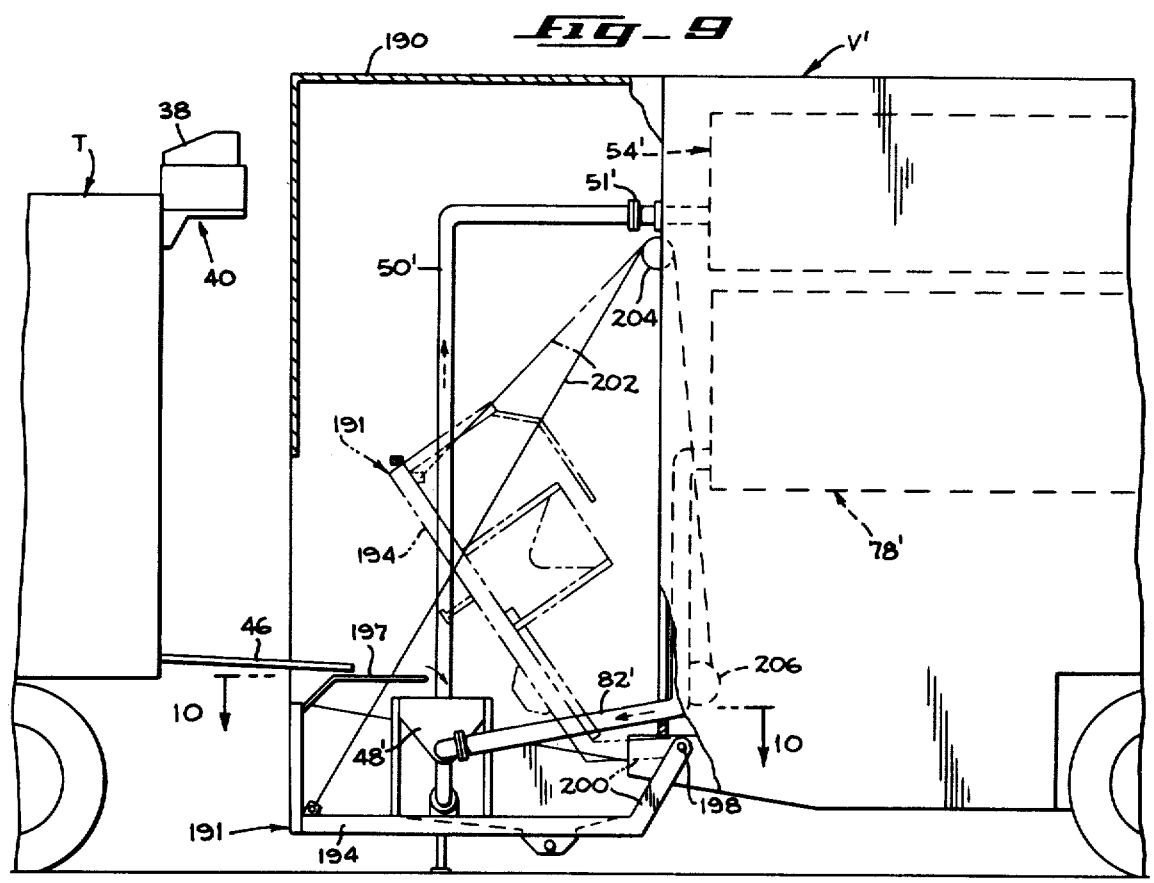
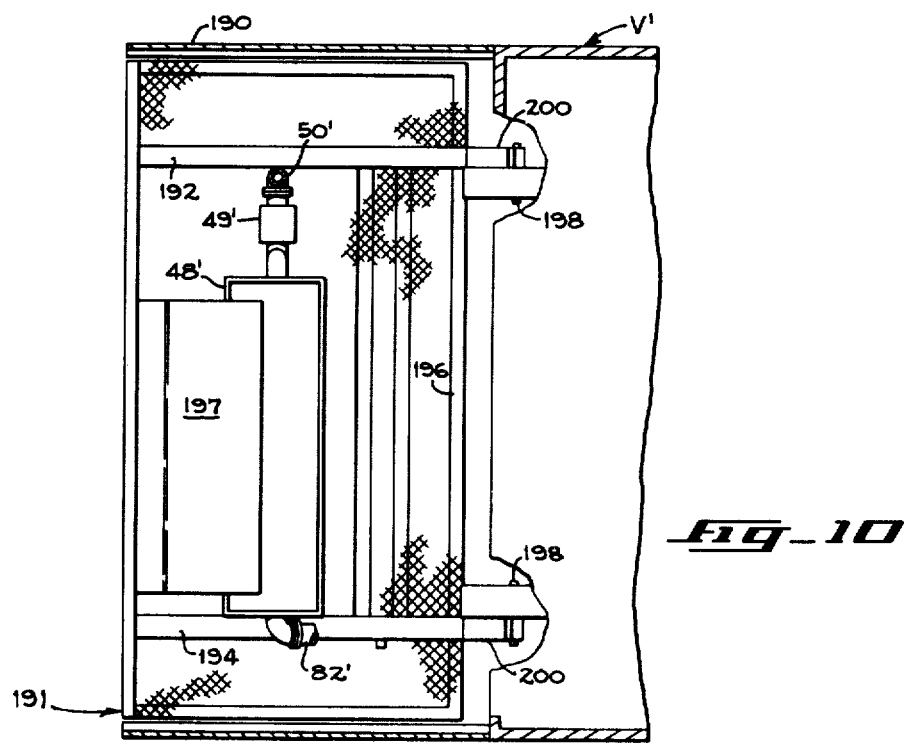

LETTUCE PROCESSING APPARATUS

This is a division of application Ser. No. 658,273, filed Feb. 17, 1976, now abandoned.

BACKGROUND OF THE INVENTION

1. Field of the Invention

This invention relates to a method and apparatus for harvesting and processing head lettuce and more particularly to a method and apparatus wherein all steps are performed at or near the field in which the lettuce is grown and with sufficient promptness after picking that deterioration of the lettuce is minimized or eliminated.

2. Description of the Prior Art

The known prior art procedure for harvesting and processing lettuce involves severing lettuce heads that are growing on the field and placing the lettuce heads in a field box or bin. In the known prior art, when the bin is full it is transported to a vacuum cooler at some remote location. A plurality of field bins are loaded into a vacuum cooler at one time for batch processing so that it frequently occurs that one or more bins are retained outside the vacuum cooler for a sufficient period of time that deterioration can take place. The prior art procedure is then to transport the now relatively cool heads to a processing plant at a remote site at which the heads are inspected, shredded, treated and packaged. Because of the substantial time between severing the head from the field and shredding of the head, the outer leaves of the head typically dry out much more than the heart of the head so that either the outer leaves must be discarded or a shredded product of non-uniform character is produced.

A method for retarding further deterioration of shredded lettuce is disclosed in U.S. Pat. No. 3,849,581 (426-145). Such method however is practiced only after the delays attending the prior art procedure described above; notwithstanding the apparent efficacy of the method, it is not able to restore lettuce that has already deteriorated due to exposure.

SUMMARY OF THE INVENTION

A head of lettuce, after it is severed from the field in which it grows, is a fragile food article of limited longevity. For optimum shelf life lettuce must be retained in an environment having closely controlled temperature and humidity characteristics. Such fragility of head lettuce has contributed to substantial waste both in the field and at the site of the ultimate consumer. In the field and in processing plants it is usual to strip and discard the exterior leaves if the lettuce has been exposed to ambient temperatures for any significant period. Because lettuce processing and shipment has required in certain instances up to a week or more, the consumer must either quickly use lettuce or risk its deterioration beyond edibility even when stored at reduced temperature.

According to the present invention head lettuce is severed from the field, shredded, and placed in a container that is constructed to prevent the temperature of the lettuce from rising above the ambient temperature, all within the period of about one minute or less. Thus since the lettuce never experiences a temperature rise significantly above that present while it is growing in a field, the present invention affords a significant increase in the quality and quantity of the yield.

An object of the invention is to provide a method and apparatus for processing lettuce so that the maximum yield of edible lettuce is obtained. The present invention affords achievement of this object by shredding the lettuce immediately after severing the same from the field and retaining such shredded lettuce in an insulated or refrigerated enclosure.

A feature and advantage afforded by achievement of the last object is that a more uniform product is provided because it eliminates differential drying which is present when lettuce is stored in head form for a substantial period of time.

Another feature and advantage attending achievement of the last stated object is the elimination of labor costs necessary in peeling off outer leaves that deteriorate when heads are stored for an extended period and elimination of the cost of disposing of the deteriorated outer leaves.

A further object of the invention is to provide method and apparatus for cleaning and packing the lettuce for shipment immediately after shredding the same so as to maximize freshness and minimize waste. This object is achieved according to the present invention by providing a self-contained mobile processing plant that can be transported to a site on or adjacent to a field. The mobile structure includes all facilities for chilling, cleaning and packing the lettuce and operates at optimum efficiency because of the proximity of the equipment to the field and the consequent reduction in elapsed time between picking and processing.

Yet another object of the invention is to provide a method and apparatus for simultaneously chilling, washing and adding preservatives to the chopped lettuce. This object is achieved by providing a quantity of water into which the preservatives can be added, chilling the water and creating a fine spray of the chilled water on a path. The shredded lettuce is conveyed along the path and tumbled at the same time so that it is cleaned, cooled and subjected to chemical preservative treatment.

A still further object is to provide a centrifuge of simplified and balanced construction. A centrifuge according to the invention can be constructed to operate smoothly without stringent manufacturing tolerances.

Yet a further object of the invention is to maximize the quantity of edible lettuce harvested from a given field. Irrespective of the care exercised in preparing, planting and caring for a lettuce field, there is inevitably a few misshapen heads which are not marketable in the fresh lettuce market but which nonetheless are composed of fully edible leaves. In known prior art lettuce harvesting techniques, such misshapen heads were not picked, but were plowed under after harvesting is completed. Because the present invention chops the lettuce at a very early stage in the practice thereof, such misshapen heads can be reduced into a saleable and highly edible product.

Yet another object of the invention is to provide apparatus that efficiently harvests the lettuce irrespective of the ambient temperature during harvesting. The apparatus includes a highly efficient chiller through which the lettuce can be transported when ambient temperatures are high, e.g., in excess of about 70° F. Because the lettuce is delivered to the chiller through a hose or tube, the chiller can be easily bypassed when the ambient temperature is less than about 70°, sufficient cooling being achieved in such relatively low ambient temperature conditions by transporting the lettuce through the hose with chilled water.

Contributing to the achievement of the object stated next above is the provision of a remotely located centrifuge; in low ambient temperature conditions the residence time of the lettuce within the hose in a water borne condition from the inlet equipment to the centrifuge is sufficient to reduce the temperature of the lettuce to the desired low temperature.

The foregoing, together with other objects, features and advantages will be more apparent after referring to the following specification and the accompanying drawings.

BRIEF DESCRIPTION OF THE DRAWINGS

FIG. 1 is a perspective view of a truck equipped with apparatus for practicing the method of the invention.

FIG. 2 is a fragmentary view of a portion of the lettuce conveyor of FIG. 1.

FIG. 3 is a perspective view of the mobile processing apparatus of the invention.

FIG. 4 is a cross-sectional elevation view of the shredded lettuce chilling apparatus employed in practicing the present invention.

FIG. 5 is a cross-sectional view taken along line 5—5 of FIG. 4.

FIG. 6 is an elevation view of the centrifuges of the present invention.

FIG. 7 is a view at enlarged scale of a fragment of FIG. 6.

FIG. 8 is a view taken along line 8—8 of FIG. 6.

FIG. 9 is a fragmentary elevation view showing a modification of the processing apparatus of FIG. 3.

FIG. 10 is a view taken along a plane designated by line 10—10 of FIG. 9.

DESCRIPTION OF THE PREFERRED EMBODIMENT

Referring more particularly to the drawings and to FIG. 1 reference character R indicates rows of growing head lettuce, adjacent rows being separated by furrows F. A truck T has wheels spaced apart by an amount equivalent to the spacing of furrows F so that the truck can traverse the field without adversely affecting the lettuce heads growing in rows R. Carried on the side of truck T is a vertically oriented shaft 12 on which is mounted for pivotal movement about the axis of the shaft a carriage 14. Secured to the bottom of carriage 14 is a conveyor 15 which includes a horizontal frame 16. The structure is so proportioned that frame 16 is positioned at a level above the surface of rows R sufficient that it clears the lettuce heads growing in such rows and low enough so that field hands can conveniently deposit severed lettuce heads on the conveyor supported by conveyor frame 16.

Conveyor frame 16 supports a cup conveyor having a plurality of cups 18 which are fixed to roller chains or the like, one such roller chain being identified schematically at 20 in FIG. 2. Frame 16 has a distal end 22 at which sprockets are journaled for guiding the cup conveyor so that the upper run thereof moves from the distal end toward truck T. Inward of carrier 14 the conveyor has a right angle support 24, there being at such location sprockets over which the roller chains move to carry cups 18 upward along a vertical conveyor run 26. At the top of conveyor run 26 are supported sprockets, one of which is shown schematically in FIG. 2 at 30 for guiding the roller chain 20 at that point in the conveyor. Each cup 18 is supported on the roller chains by a pivot pin 32, the pivot pin being secured to the cup above the center of gravity of the cup so that the cups are biased to an upright position.

In operation cup conveyor 15 is operated so that the cups on the upper flight of the horizontal frame 16 move toward the truck, i.e. from left to right as viewed in FIG. 1. The truck traverses the field at a relatively slow speed so that field hands walking behind the conveyor can sever lettuce heads from the field, remove the core of the lettuce head, discard the outer leaves of the head and place the lettuce head in one of the cups 18. Cups 18 are proportioned so that they accommodate one and only one lettuce head, whereby as the heads travel on the conveyor, they do not rub against one another or against any machine parts. At the upper end of vertical conveyor section 26 is a fixed cam 34 which cooperates with a finger 36 mounted on each cup 18 so that as the cups move past cam 34 they are tilted thereby discharging the lettuce heads therefrom.

In receiving relation to the cup conveyor is an inlet hopper 38 which constitutes part of a conventional shredder 40. One suitable commercially available shredder is an Urschel Model H, manufactured by Urschel Laboratories, Valparaiso, Ind.; such shredder can be set to cut the lettuce either into long relatively thin pieces or into relatively large (e.g. 1¼ inch × 1¼ inch) square or rectangular pieces. Shredder 40 is supported on the rear of truck T near the top thereof and has a discharge directed to the truck interior.

The floor of truck T is defined by a conveyor belt 42 that has a width substantially coextensive with the truck and is driven forward or rearward by an extremely slow drive mechanism not shown. Accordingly as the truck traverses the field and shredded lettuce is introduced into the truck from shredder 40, the mass of shredded lettuce accumulated within the truck moves slowly forward to effect uniform distribution of the shredded lettuce within the truck. Truck T includes an enclosure surrounded and enclosed by a hollow wall W formed by spaced apart panels 43 and 43'. A blower or refrigeration unit U delivers air to the volume defined between panels 43 and 43'. If unit U is a blower, it delivers air at ambient temperature and the structure is capable of preventing the lettuce temperature from rising above ambient. If unit U is a refrigerator, the temperature of the lettuce is also prevented from exceeding ambient and is indeed reduced.

In operation the truck moves over the field in furrows F and a crew of field hands walks behind conveyor 15. The field hands manually sever the lettuce heads from rows R and, after coring the lettuce heads and removing the outer leaves, place the heads individually in cups 18. Because each lettuce head is supported in a single cup 18, the head is not subjected to bouncing or rubbing whereby the outermost leaves are not bruised or otherwise adversely affected.

The heads proceed in single file along the conveyor and up vertical section 26 until the heads are dumped one by one into hopper 38 in response to contact of cam 34 by finger 36. Single file presentation of the lettuce heads to shredder 40 optimizes the efficiency of the shredder, because it works against a substantially constant load and is not subjected to surges of input as is the case where many heads are dumped into the input hopper at one time. Moreover, delivery of the heads one-at-a-time to the shredder eliminates bridging of hopper 38 by a plurality of heads. Thus the shredder works smoothly without operator attention and consumes minimal power. The shredded lettuce is discharged into the interior of truck T and because conveyor floor 42 moves slowly forward, a uniformly distributed mass of lettuce within the truck is formed. Conveyor 16 is typically operated at about 85 feet per minute so that the time elapsing between severing the head and introducing the shreded lettuce into truck T is less than one minute. Accordingly the outer leaves of the head do not dry out or loose turgidity whereby the mass of shredded lettuce within truck T is of uniform quality. The insulated and/or refrigerated truck enclosure prevents significant deterioration or temperature rise of the shredded lettuce contained therein. When truck T is full conveyor 15 is pivoted about the axis of shaft 12, to a position shown in FIG. 3, so that the truck can efficiently move from the field at relatively high speed.

On or adjacent the field is a mobile processing van V, a pumping conveyor P and a centrifuge enclosure C. Truck T backs into a position in alignment with an inlet opening 44 in pumping conveyor P and a tailgate or ramp 46 is folded down to form a discharge path for the shredded lettuce. Conveyor 42 is operated in a reverse direction so that the shredded lettuce supported thereon is discharged over ramp 46 into an input trough 48. Input trough 48 is a conventional device available from the Key Equipment Company, Milton-Freewater, Ore. Water and the shredded lettuce are pumped through the trough to an outlet by a pump 49 such as a 3-inch Model NL, manufactured by the Cornell Pump Company, Portland, Ore. Within the enclosure of pump conveyor P there is sufficient space on either side of ramp 46 for a workman to stand and move the lettuce into trough 48 and remove any spurious material therefrom. The water is delivered to trough 48 through a line 82 and is chilled or refrigerated by a unit within van V to be described before it reaches the trough. Accordingly the reduction of temperature of the lettuce commences as it is discharged into the trough. Because an efficient field crew can fill a truck T in about one hour and because the truck is insulated and/or refrigerated, the temperature differential between the shredded lettuce and the water within trough 48 is minimized thereby requiring less energy to chill the shredded lettuce down to a temperature slightly above freezing.

There is additional space within pump conveyor P for one or more inspectors to stand adjacent trough 48 and remove from the trough any spurious articles or defective portions. The shredded lettuce and water are pumped through a discharge hose 50 up to a level at or near the top of van V. The discharge hose 50 extends through a coupling 51 and a gasketed opening 52 in a rear panel of van V and into a chiller-washer unit 54.

Chiller-washer unit 54 includes a drum 56 supported for rotation on a generally horizontal axis. At one end drum 56 is supplied with a ring gear 58 which meshes with a pinion 60 driven by a drive motor (not shown). Consequently drum 56 revolves in a counterclockwise direction as viewed in FIG. 5. The wall of drum 56 is perforated as at 62 so that water entering the drum can drain therefrom. Such water is introduced into the drum by spraying from a plurality of nozzles 64 which are supported by and supplied with water from a water pipe 66 which extends interior of the drum in a location above the central axis thereof. As seen in FIG. 4, nozzles 64 are arranged to produce an obliquely directed spray toward the outlet or right hand end, as viewed in FIG. 4, of the chiller-washer apparatus. Such oblique orientation together with the presence of helical flights 68 on the interior of drum 56 cause the shredded lettuce to move through the chiller-washer. There are nozzles 64a (see FIG. 5) that are directed in a downward-forward position; there are nozzles 64b that are oriented to impinge on drum 56 above the lower extremity thereof. Nozzles 64b are oriented obliquely of vertical in both the axial direction of drum 56 and the radial direction of the drum. The latter orientation of nozzles 64b is particularly effective, in view of the rotation of drum 56, in assuring impingement on all lettuce surfaces as the lettuce rises on the drum surface in response to drum rotation. Because there is a large number of nozzles 64 and because the spray from each is relatively fine, all surfaces of the lettuce are treated with water delivered to pipe 66 without employing a substantial quantity of water. Accordingly the water can be efficiently chilled to a temperature above freezing and no greater than about 40°.

For chilling the water there is disposed in water receiving relation of the water flowing through perforate portions 62 of the drum a receiving pan 70 located below the drum. An imperforate deflector 71 deflects water from nozzles 64b that passes through drum 56 into the receiving pan. Receiving pan 70 has a plurality of strategically located discharge openings 72 which are arranged so that water falling therethrough is distributed so as to traverse refrigerating coils 74 in heat exchanging relationship therewith. Accordingly, by the time the water reaches a pool 76 at the bottom of an impervious housing 78 within which coils 74 are disposed, the temperature of the water is reduced to the desired temperature. A circulating pump 80 withdraws water from pool 76 and delivers it through pipe 66. There is also an outlet 82 from pool 76 which delivers chilled water to trough 48 in pumping conveyor P. Accordingly one refrigeration system (associated with coil 74 and indicated schematically at 84) maintains the water temperature so that it is effective in rapidly chilling the shredded lettuce as it is processed in the apparatus of the invention and so that the lettuce emerges from chiller-washer 54 at the temperature of the water, e.g. 34° F.

Various preservatives, such as those described in the above cited U.S. Pat. No. 3,849,581 are useful in retarding deterioration of the lettuce. Insofar as the present invention is concerned, the employment of preservatives is optional. Such preservatives are supplied in drums 86 and can be added to pool 76 by means of a pump 88 which is controlled in a conventional way to deliver the preservatives at a correct rate. Accordingly as the shredded lettuce egresses from the chiller-washer, it is at a temperature sufficiently low as to retard significant deterioration and it has been treated with such preservative materials as may be desired to enhance further the longevity thereof.

Lettuce egressing from chiller-washer 54 is discharged into an impervious housing 90 having an upper inlet opening 91 of a size corresponding to the diameter of drum 56 so that the housing receives lettuce and water from the drum. Housing 90 converges downward to a relatively small diameter outlet 92 for output to a pump 93 which is of the type identified hereinabove by reference numeral 49 and installed within pumping conveyor P. Pump 93 has an outlet hose 94 through which lettuce and chilled water are discharged. The opposite end of hose 94 extends through a coupling 95 and the wall of processing van V to a Y fitting 96 mounted in centrifuge enclosure C. The outlet legs of Y fitting 96 are connected through alternately operated solenoid valves 98 and 100 which are arranged to discharge the water borne lettuce into respective centrifuges 102 and 104.

Each centrifuge 102, 104 includes an outer impervious fixed drum housing or curb 106 which is carried by structural support members 108. Extending centrally of each housing 106 is a shaft 110 which is supported by an upper bearing 112 and a lower bearing 114. Each shaft 110 has at the upper end thereof a drive mechanism respetively indicated at 116 and 118 which drive shafts 110 of the respective centrifuges.

Secured to each shaft 110 is a plurality of spokes 120 which support a rigid ring 122 in concentric relation to shaft 110; depending from and rigid with ring 122 is a perforated basket 124 which is disposed concentrically within fixed impervious housing 106 such that the water that passes through the perforations in drum 124 in response to rotation of the device is confined within the impervious housing. Such water gravitates to a manifold 126 for return to pool 76 through a pipe 127, a filter 127f and a pump 127p. The lower end of perforated basket 124 is reinforced by a ring 123 which defines a bevelled surface 123b. There is a conical wall 128 having an angle of convergence corresponding to the bevel angle of surface 123b so that when the conical wall is in an upward, closed position (shown at the right hand side of FIG. 6), a water tight joint between ring 123 and the conical wall is established.

The upper end of conical wall 128 is fixed to a bushing 129 which slidably circumscribes shaft 110. The lower end of conical wall 128 is supported by a plurality of spokes 130 which radiate from a circular plate 131 which is supported for reciprocal movement on shaft 110 by a bearing seal 133 which is backed by a cylindric flange 134 fixed to the lower surface of the circular plate. Secured to the periphery of circular plate 131 and depending therefrom is an impervious cylindrical wall 135. For cooperating with the inner surface of cylindrical wall 135 to define an air chamber there is a piston plate 136 fixed to shaft 110, the outer periphery of the piston plate having seals 137 which form an airtight seal against the inner wall of cylinder 135 to define an air chamber 138.

The lower end of shaft 110 is formed with an axial bore 139 and a radial bore 140 which cooperate to establish an air path between the exterior chamber 138 and the interior thereof. It will be appreciated that air applied to the lower extremity of bore 139 will pressurize chamber 138 to cause circular plate 131 and conical wall 128 to move upward into a position to close the centrifuge. Release of the air pressure permits the conical wall the the elements fixed thereto to fall in response to the force of gravity so as to permit opening of the centrifuge and discharge of the contents thereof.

In one system designed according to the present invention basket 124 has a diameter of about 34 inches and a vertical dimension in the same order of magnitude. Such structure, particularly when filled with wet lettuce and rotated at a fast speed, is subject to substantial stresses. Because conical wall is rigidly supported by spokes 130 and because of the substantial force imposed by air chamber 138, the conical wall when engaged with the bevelled surface 123b provides a structure of sufficient strength to withstand such stresses.

Disposed below centrifuges 102 and 104 are impervious troughs 147a and 147b respectively which are sloped toward a site intermediate the troughs for discharge onto a conveyor 148. Conveyor 148 extends into van V through a duct or tunnel 149 which houses the conveyor and establishes communication between van V and centrifuge enclosure C so that cold air produced in the former will circulate into the latter.

Because centrifuges 102 and 104 and the lettuce and water introduced thereinto are heavy and are subjected to extremely high speeds and centrifugal forces, it is important that the centrifuge enclosure C be firmly anchored. For this purpose there is a concrete foundation 150, one such foundation being constructed at each site where the apparatus will be operated. The sites are typically sufficiently close to lettuce fields that truck T, when filled with shredded lettuce, can reach the processing van within a short time so as to assure continuous product flow and to reduce the possibility of deterioration of the lettuce.

Foundation 150 has a base portion 152 which bears on the earth's surface to support the weight of the foundation and the weight of centrifuge enclosure C superposed thereon. Projecting upward from the periphery of the base portion is a wall 154 which defines a rectangular support surface generally congruent to the rectangular perimeter of centrifuge enclosure C. The enclosure has a rectangular base frame formed by suitable structural members, such as box beams 156, on which the centrifuges, a framework and enclosure walls are fixed. The framework includes cross beams 157 which reinforce the frame and afford support for the centrifuges. Secured to the exterior peripheral surface of structural members 156 is a row of tubular members 158, there being imbedded in foundation wall 154 at equally spaced apart intervals a plurality of tubular members 160. The exterior surface of foundation wall 158 is notched as at 162 to afford access to the lower end of tubular members 160. Through bolts 164 are extended through aligned tubular members 158 and 160, and nuts 166 are engaged on the opposite end of the through bolts to fix securely centrifuge enclosure C to the foundation.

The height above grade of the support surface defined by foundation wall 154 is established approximately equal to the height above grade of a flat bed truck, e.g. about 54 inches. In order to install centrifuge enclosure C on foundation 150, the truck carrying the enclosure is placed adjacent foundation 150 and the enclosure is slid from the bed of the truck onto the foundation. When tubular members 158 on the enclosure are aligned with respective tubular members 160 within the foundation, bolts 164 and nuts 166 are installed and operation can proceed without excessive vibration in view of the substantial mass of the foundation and the fact that the foundation is embedded in the earth's surface. Interior of foundation wall 154, a drain pipe 167 is provided so as to maintain the interior in a dry condition.

In accordance with the present invention centrifuge 102 and 104 are operated alternately on a cycle of between about two to six minutes. That is to say, solenoid valve 98 is closed and valve 100 is opened for a period. This deposits shredded lettuce into centrifuge 104. When the centrifuge is full, drive 118 is activated to spin the centrifuge and cause water remaining on the surface of the shredded lettuce to move outward through perforate basket 124 for eventual discharge through pipe 127 to pool 76. During the loading and high speed spinning of centrifuge 104, air pressure chamber 138 associated with that centrifuge maintains the centrifuge in a closed condition. Air is released from the chamber associated with centrifuge 102 so that the conical wall drops to permit the lettuce in centrifuge 102 to discharge, the discharge occurring a path, such as identified by arrow 146, so that the shredded lettuce falls by gravity onto a table 147a. At this time all surface moisture on the lettuce has been removed so that the lettuce is substantially dry. Because centrifuge enclosure C and van V are maintained at a temperature no greater than about 40°, the lettuce is fresh and turgid.

The dry cold lettuce is deposited onto conveyor 148 by gravity and is transported by the conveyor through tunnel 149 and into van V. See FIG. 3. The lettuce discharges from the end of conveyor 148 onto a table 168 which has a generally inverted V-shape so that the lettuce tends to move laterally outward of the center or mid-line of the table. At the outward edge or lateral extremity of table 168 there is a plurality of openings which communicate with downward depending funnels or chutes 170. Oriented below each chute 170 is a scale platform 172 on which is supported a container such as a plastic bag or the like 174. A readout for each scale 172 (not shown) is provided at the eye level of a workman so that when a preselected weight of shredded lettuce has been moved into container 174 through chute 170, the container can be removed from the funnel, evacuated, and tied off or similarly closed in accordance with conventional procedure. It should be noted that table 168 is proportioned such that there is sufficient space between the extremity of the table and the side wall of van V for workmen to stand on either side of the table and package the lettuce as it is discharged from conveyor 148. The space is sufficient to accommodate vacuum apparatus for evacuating air from containers 174 prior to closure, if such is required in a particular situation. When containers 174 are closed, several such containers are placed in a shipping carton 176. Cartons 176 are transported by a conveyor (not shown) to a sealing station 178 where the cartons of shredded lettuce containers are sealed. From sealing station 178 the sealed filled cartons are placed on a roller conveyor, the distal end of which is seen at 180 disposed within a semi-trailer S. The side wall of van V is provided with an opening (not shown) so that the packaged products can be promptly and efficiently loaded into trailer S. Trailer S is typically refrigerated, and when it is full, it is ready to be transported over the road to the consumer's location.

Included within van V at the forward end thereof is a power station 182 where there are located generating facilities for providing the power to power the equipment and refrigerate the air within van V and enclosure C. Rearward of power station 182 is a carton setup station 184 at which one or more operators can take carton flats and set them up for transfer on a conveyor 186 to receive a plurality of lettuce packages 174 therein. Thus the path of movement of the cartons commences at carton setup station 184, proceeds on conveyor 186 to a location adjacent table 168 where the cartons are filled with a preselected number of lettuce containers, and thence to sealing station 178 from which, after the cartons are sealed, they are transported via roller conveyor 180 to semi-trailer S.

To summarize the operation of the method and apparatus of the invention, it will be assumed that trailer T has been filled with shredded lettuce as described above. Because van V, pumping conveyor P and centrifuge enclosure C are portable or mobile structures, they are positioned closely adjacent the field traversed by truck T in consequence of which the lettuce is extremely fresh when it is discharged into trough 48 of pumping conveyor P. The water in trough 48 is maintained at a temperature no greater than about 40° so that chilling is commenced immediately on discharge of shredded lettuce into the trough. Because of the clear space along the trough and on opposite sides of chute 46, workmen can manually move the lettuce into the processing line and can remove any spurious objects or defective lettuce pieces. When the lettuce has completed its traverse of trough 48, it is pumped upward through discharge hose 50 into chiller-washer 54.

Traverse of the lettuce through the chiller-washer results in efficient chilling of the lettuce, because the relatively fine sprays produced by nozzles 64 afford impingement on each and every lettuce piece with a stream of chilled water. The rotation of drum 56, the presence of flight 68 and the oblique orientation of nozzles 64 cooperate to expose all surfaces of each lettuce piece to the chilled water. This completes heat extraction from the lettuce as sell as affording efficient and uniform addition of preservatives dissolved in the water from drum 86. Throughout the traverse of the lettuce through chiller-washer 54 the water is circulated over coils 74 so that heat energy therein is quickly removed whereby upon delivery into housing 90, the temperature of the lettuce is substantially that of the water, i.e. above freezing but no greater than about 40°. The lettuce and cold water are pumped through hose 94; during traverse of hose 94 the low temperature of the lettuce is maintained. Depending upon which solenoid valve 98, 100 is open, the lettuce and water are delivered to one or the other of the centrifuges 102 and 104. Because the centrifuges operate alternately, pump 93 can operate continuously so that the movement of the lettuce through the apparatus is continuous. After treatment in the centrifuge for an appropriate period (e.g. 2–6 minutes), air is discharged from chamber 138 so that cone 128 drops and permits gravity discharge of the shredded lettuce onto one of the tables 147a, 147b for delivery to conveyor 148 and transport to table 168. At this stage all free surface water has been removed from the lettuce pieces. The now dry, chilled lettuce is moved across one of tables 147a, 147b to conveyor 148 and thence to table 168. Workmen standing adjacent to table 168 move the lettuce into chutes 170 and the containers supported thereunder. In a typical practice of the invention, the containers have a capacity of 10 pounds and when that weight is indicated by the readouts associated with scales 172, the workman removes the container, evacuates the air therefrom, seals it and places it in a carton 176. Typically cartons 176 are sized to contain three packages or 30 pounds of shredded lettuce whereupon the packages are conveyed to station 178 for sealing and subsequent loading into semi-trailer S.

The total elapsed time between severing the lettuce head from the field and placing it in conveyor 16 until it is treated, chilled and sealed in containers 174 can range from about ½ hour to about 2 hours and during the entire time the lettuce is protected by insulated or refrigerated truck T and the low temperature atmosphere within pumping conveyor P, van V and centrifuge enclosure C. The capacity of the apparatus is such that shredded lettuce from three trucks T can be handled on a substantially continuous basis. In this preferred mode of practice of the invention, one truck T traverses the lettuce field with a crew of pickers while a second truck T discharges its load into pumping conveyor P and a third truck travels between the field and the processing van.

Because of the repeated exposure to cold water of lettuce leaves traversing chiller 54, the lettuce can be rapidly reduced to less than 40° F. from ambient temperatures of up to 80 or 90 degrees or more. When the ambient temperature and therefore the temperature of the lettuce is lower, however, it is not essential that the lettuce be conveyed through the chiller to reduce the temperature of the lettuce to a temperature below 40° F. More specifically, in ambient temperatures of 55°-60° F., it has been found that sufficient heat is extracted from the lettuce by pumping the same directly from the outlet of trough 48 to the centrifuges in centrifuge enclosure C. To ready the apparatus for operation in such relatively low ambient temperature environment, it is only necessary to disconnect couplings 51 and 95 and provide a hose that directly connects hose 50 to Y fitting 96. The cool water delivered to trough 48 from pool 76 in the refrigeration system has been found sufficient to reduce the lettuce to a temperature below 40° by the time it reaches the centrifuge. This is the case because the water to lettuce ratio is approximately 10 to 1 and the residence time within the hose from coupling 51 to coupling 95 (about 4-12 seconds) is sufficient to cool the lettuce. Thus the invention affords versatility by being operable in a wide range of ambient temperatures at maximum efficiency and optimum power consumption at all such temperatures.

In the modification shown in FIGS. 9 and 10, the inlet trough and food pump are mounted within the van thereby eliminating the need for a separate pump conveyor unit P. In the detailed description of FIGS. 9 and 10, reference numerals employed in connection with FIG. 3 with the addition of a prime will be employed to identify corresponding parts. In FIG. 9 is shown the rear fragment of a van V' having therein a chiller 54', an impervious water storage and cooling container 78' and other processing and packaging equipment described hereinabove in connection with FIG. 3. Rigid with and extending rearward from van V' is a protective enclosure 190 the bottom of which is formed by a rigid frame 191 including longitudinally extending structural members 192 and 194 and transverse reinforcing members 196. Supported on such frame is an inlet trough 48' and a horizontal platform 197 which has a forward edge overlying the trough to facilitate introduction of lettuce thereinto. The frame is supported to the rear of the frame members underlying van V' by pivot points 198, the forward ends of frame members 192 and 194 having angularly upward extending portions 200 which position the frame at a low level so that chopped lettuce from truck T can be discharged into trough 48' via gravity. A cold water inlet pipe 82' delivers water to one end of the trough and at the opposite end of the trough is a food pump 49' of the type referred to hereinabove for pumping the cold water and lettuce through discharge hose 50'. The lettuce is conveyed through chiller 54', when the ambient temperature is relatively high, and directly to the centrifuges, when the ambient temperature is relatively low.

In order to achieve gravity feed from truck T into trough 48' it is desirable that trough 48' be supported at a low level, seen in FIG. 9. However, for movement of van V' over the road it is imperative to raise the trough and its supporting structure to an elevated position. For achieving this purpose there is a pivoting mechanism to raise the trough frame to the broken line position shown in FIG. 9. Exemplifying such mechanism is a cable 202 trained around a sheave 204 and then wound on a motor driven winch 206. Thus when it is desired to ready van V' for receipt of chopped lettuce from truck T, cable 202 is released until frame 191 reaches the horizontal position shown by solid lines in FIG. 9. When it is desired to prepare van V' for over the road movement, winch 209 is activated to raise frame 191 to the broken line position of FIG. 9.

Because operation of the embodiment of FIGS. 9 and 10 is substantially identical to that described above, the operation of the embodiment will not be explained in detail at this point. It is sufficient to say that setup time is shortened because the inlet trough is integral with van V'. By lowering tail gate 46 of truck T, resting its outer end on platform 197, and actuating conveyor 42 within the truck, the lettuce is moved over the platform and into trough 48' for delivery to the processing apparatus within the van.

Thus the freshness and turgidity of the lettuce is retained, and because the temperature rise of the lettuce is minimized, a minimum amount of power is required to chill the lettuce to a proper storage and shipping temperature. Depending the distances involved, fresh, clean ready-to-eat shredded lettuce can arrive at the consumer the day following the day during which it is picked. Because the method and apparatus of the invention are arranged for rapid handling of the lettuce in a protected and reduced temperature atmosphere at all times, the freshness and turgidity of the lettuce is maintained so that the product when it reaches the consumer has substantial shelf life. This should be contrasted with typical prior art methods in which more than one day elapses before the lettuce reaches a shredding and processing plant. During the one day period the lettuce is subjected to deterioration whereby much lettuce is wasted or the quality of the final product is lowered.

Thus it will be seen that the present invention provides a method and apparatus for harvesting and processing lettuce which produces a shredded lettuce product of unparalleled freshness and consequent long shelf life. Because of the efficient and rapid handling of lettuce, the power necessary to clean and chill the lettuce is minimized whereby it is entirely feasible to provide mobile processing apparatus that can be moved from field to field and area to area depending on the maturity of the crops. Not only is waste minimized, but the cost of removing and disposing of outer lettuce leaves incurred in prior art procedures is reduced, if not eliminated. Finally the apparatus is arranged to efficiently utilize manual labor so that the total number of laborers is held to an absolute minimum. Although one embodiment of the invention has been shown and described it will be obvious that other adaptations and modifications can be made without departing from the true scope and spirit of the invention.

What is claimed is:

1. Apparatus for processing lettuce comprising in combination an enclosure, means for transporting the enclosure to a field site, said enclosure defining a product input opening, means for delivering shredded lettuce to said opening, an open ended drum supported for rotation on a substantially horizontally extending axis and disposed in lettuce receiving relationship to said opening, means for rotating the drum with respect to its central axis, means for supplying chilled water to said drum for lowering the temperature of and cleaning lettuce introduced thereinto, said drum having an interior cylindric surface defining a helical flight so that lettuce traverses the drum in response to rotation thereof, means in lettuce receiving relation to the other end of said drum for conveying lettuce and water away from said drum, said conveying means having means for controllably alternately diverting the lettuce and water between a first path and a second path, first and second centrifuges disposed in lettuce receiving relationship to respective said paths of said conveying means so that lettuce is conveyed to one or the other of said centrifuges, said centrifuges being adapted to discharge the contents thereof through a bottom opening, a receiving table and means for transporting lettuce from said centrifuges to said receiving table, and means associated with said receiving table for packing lettuce thereon into containers.

2. Apparatus according to claim 1 wherein said receiving table includes a mid-line, first and second surfaces diverging downward and outward from said mid-line, said transporting means discharging lettuce on said mid-line for substantially uniform distribution to said first and second surfaces, said packaging means being disposed remote from said center line.

3. Apparatus according to claim 2 wherein said first and second centrifuges include respective first and second drive shafts and means for supporting said drive shafts in vertical alignment on said mid-line, said supporting means each including a lower bearing below respective said centrifuges and an upper bearing above respective said centrifuges.

4. Apparatus according to claim 3 in combination with means for sequentially discharging said centrifuges, said discharging means being disposed below said centrifuges.

5. Apparatus according to claim 4 wherein said centrifuges each includes a cylindric basket, means for supporting said basket concentrically of said shaft, said basket having a circular rim at the lower end thereof and an impervious conical wall supported for axial movement relative said shaft into sealing engagement with said rim, and wherein said discharging means includes means for lowering said disc away from said rim and axially of said shaft.

6. Apparatus according to claim 1 wherein said enclosure is insulated, there being means therewithin for refrigerating the interior of said enclosure.

7. Apparatus according to claim 1 wherein said lettuce delivering means comprises a horizontal lettuce receiving trough, means for introducing water into said trough for floating lettuce, a discharge line extending from said trough to said enclosure opening, pump means for pumping water and floated lettuce through said pipe, and means for establishing fluid communication between said trough and the water from said drum for recirculating the same.

* * * * *